United States Patent
Zhu et al.

(10) Patent No.: US 11,144,416 B2
(45) Date of Patent: Oct. 12, 2021

(54) DEVICE FAULT PROCESSING METHOD, APPARATUS, AND SYSTEM

(71) Applicant: HUAWEI TECHNOLOGIES CO., LTD., Shenzhen (CN)

(72) Inventors: Huixiong Zhu, Shenzhen (CN); Wei Liu, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/903,483

(22) Filed: Jun. 17, 2020

(65) Prior Publication Data
US 2020/0310933 A1 Oct. 1, 2020

Related U.S. Application Data
(63) Continuation of application No. PCT/CN2018/123740, filed on Dec. 26, 2018.

(30) Foreign Application Priority Data

Dec. 28, 2017 (CN) .......................... 201711452816.8

(51) Int. Cl.
*G06F 11/22* (2006.01)
*G06F 11/14* (2006.01)
(Continued)

(52) U.S. Cl.
CPC ...... *G06F 11/2221* (2013.01); *G06F 11/1441* (2013.01); *G06F 11/27* (2013.01); *G06F 13/40* (2013.01); *G06F 2213/0026* (2013.01)

(58) Field of Classification Search
CPC ............. G06F 11/2221; G06F 11/1441; G06F 11/3051; G06F 11/0703; G06F 11/0751; G06F 11/0793; G06F 13/10
See application file for complete search history.

(56) References Cited

U.S. PATENT DOCUMENTS

2012/0079312 A1\* 3/2012 Muthrasanallur ... G06F 11/0793
714/5.1
2012/0144231 A1\* 6/2012 Yagi ..................... G06F 11/1441
714/4.5
(Continued)

FOREIGN PATENT DOCUMENTS

CN 101299678 A 11/2008
CN 103019870 A 4/2013
(Continued)

*Primary Examiner* — Matthew M Kim
*Assistant Examiner* — Kurosu Risa Altaf
(74) *Attorney, Agent, or Firm* — Maier & Maier, PLLC

(57) ABSTRACT

A device fault processing method is used to perform fault processing on a peripheral component interconnect express device. The method includes: obtaining, by the controller, first device fault information after detecting that the device is faulty, where the first device fault information is used to indicate that the device is faulty, the first device fault information includes a first value of a fault processing state parameter of the device, and the first value indicates that the device is in a soft reset state; and performing, by the controller, hot reset processing on the device, so as to implement fault processing on the peripheral component interconnect express device without manual intervention in plugging out and plugging in or resetting a pluggable unit in which the peripheral component interconnect express device is located and without manual resetting on a computer system.

17 Claims, 7 Drawing Sheets

(51) Int. Cl.
*G06F 11/27* (2006.01)
*G06F 13/40* (2006.01)

(56) References Cited

U.S. PATENT DOCUMENTS

| | | | |
|---|---|---|---|
| 2014/0003451 | A1 | 1/2014 | Wagh et al. |
| 2015/0082080 | A1* | 3/2015 | Lin ................... G06F 11/0751 714/5.1 |
| 2017/0116071 | A1* | 4/2017 | Arroyo ............... G06F 11/3027 |
| 2017/0192838 | A1 | 7/2017 | Jeong et al. |
| 2018/0089047 | A1* | 3/2018 | Cooper .............. G06F 13/4068 |

FOREIGN PATENT DOCUMENTS

| | | |
|---|---|---|
| CN | 103532728 A | 1/2014 |
| CN | 104391755 A | 3/2015 |
| CN | 104756081 A | 7/2015 |
| CN | 106201753 A | 12/2016 |
| CN | 106201755 A | 12/2016 |
| CN | 106844078 A | 6/2017 |
| CN | 108228374 A | 6/2018 |

\* cited by examiner

DEVICE FAULT PROCESSING METHOD, APPARATUS, AND SYSTEM

CROSS-REFERENCE TO RELATED APPLICATIONS

This application is a continuation of International Application No. PCT/CN2018/123740, filed on Dec. 26, 2018, which claims priority to Chinese Patent Application No. 201711452816.8, filed on Dec. 28, 2017. The disclosures of the aforementioned applications are hereby incorporated by reference in their entireties.

TECHNICAL FIELD

Embodiments relate to the field of computer technologies, and to a device fault processing method, apparatus, and system.

BACKGROUND

A computer system includes a plurality of peripheral component interconnect express (PCIe) devices connected to a processor. Many faults occurring on the PCIE device are caused by a soft failure. To eliminate such faults, a current method is to plug in and plug out or reset a pluggable unit in which a faulty PCIE device is located through manual intervention. In this way, other PCIE devices that are not faulty in the pluggable unit cannot work normally, and a plug-in and plug-out operation or a reset operation takes more time. This affects service processing efficiency of the other PCIE devices that are not faulty before the pluggable unit is plugged in and plugged out or reset. Another existing method for eliminating such faults is resetting the computer system. This affects all services being processed by the computer system, and more soft faults may be caused. If the computer system is reset after the services are processed by the computer system, such faults of the PCIE device cannot be processed immediately. This reduces efficiency of fault processing, and indirectly affects service processing efficiency of the computer system.

SUMMARY

Embodiments provide a method, an apparatus, and a system for processing a fault on a peripheral component interconnect express (PCIE) device. After a single faulty PCIE device is isolated, reset processing is performed on the single faulty PCIE device, so as to recover the single faulty PCIE device without effect on normal services of other PCIE devices in a pluggable unit in which the PCIE device is located or all normal services in an entire computer system during the recovery, and to improve fault processing efficiency.

According to a first aspect, a device fault processing method is provided. The method is used to perform fault processing on a device, and the device is a PCIE device. The method is performed by a controller, and includes: obtaining first device fault information, and performing hot reset processing on the device based on a first value that is of a fault processing state parameter of the device and that is included in the first device fault information, where the first device fault information is used to indicate that the device is faulty, the first device fault information includes the first value of the fault processing state parameter of the device, and the first value of the fault processing state parameter of the device indicates that the device is in a soft reset state.

In this embodiment, after obtaining the first device fault information, the controller performs the hot reset processing on the PCIE device, so as to implement fault processing on the PCIE device without manual intervention in plugging in and plugging out or resetting a pluggable unit in which the PCIE device is located, and without manual resetting on a computer system.

According to the first aspect, in a first implementation, before the obtaining of first device fault information, the method further includes: detecting whether the device is faulty. Then, if the device is faulty, generating the first device fault information; querying whether a value of the fault processing state parameter of the device is an initial value; and, if the value of the fault processing state parameter of the device is the initial value, modifying the value of the fault processing state parameter of the device to the first value. The obtaining of the first device fault information includes: updating the first device fault information to obtain updated first device fault information, where the updated first device fault information includes the first value of the fault processing state parameter of the device.

According to the first aspect or the first implementation of the first aspect, in a second implementation, after performing hot reset processing on the device, the method further includes: obtaining second device fault information, where the second device fault information is used to indicate that the device is faulty, the second device fault information includes a second value of the fault processing state parameter of the device, and the second value of the fault processing state parameter of the device indicates that the device is in a hard reset state; and performing cold reset processing on the device based on the second value that is of the fault processing state parameter of the device and that is included in the second device fault information.

According to the second implementation of the first aspect, in a third implementation, after performing hot reset processing on the device, and before the obtaining second device fault information, the method further includes: detecting whether the device is faulty; if the device is faulty, generating the second device fault information; querying whether the value of the fault processing state parameter of the device is the first value; and, if the value of the fault processing state parameter of the device is the first value, modifying the value of the fault processing state parameter of the device to the second value. The obtaining of the second device fault information includes: updating the second device fault information to obtain the updated second device fault information, where the updated second device fault information includes the second value of the fault processing state parameter of the device.

According to the first aspect or the first implementation of the first aspect, in a fourth implementation, after the performing hot reset processing on the device, the method further includes: detecting whether the device is faulty; and, if the device is not faulty, modifying the first value of the fault processing state parameter of the device, and modifying the first value of the fault processing state parameter of the device to the initial value.

According to the second or the third implementation of the first aspect, in a fifth implementation, after performing cold reset processing on the device, the method further includes: obtaining third device fault information, where the third device fault information is used to indicate that the device is faulty, the third device fault information includes a third value of the fault processing state parameter of the device, and the third value of the fault processing state parameter of the device indicates that the device is in a faulty state; and powering off the device based on the third value that is of the fault processing state parameter of the device and that is included in the third device fault information.

According to the fifth implementation of the first aspect, in a sixth implementation, after the performing cold reset processing on the device, and before the obtaining third device fault information, the method further includes: detecting whether the device is faulty. If the device is faulty, generating the third device fault information; querying whether the value of the fault processing state parameter of the device is the second value; and, if the value of the fault processing state parameter of the device is the second value, modifying the value of the fault processing state parameter of the device to the third value. The obtaining of the second device fault information includes: updating the third device fault information to obtain updated third device fault information, where the updated third device fault information includes the third value of the fault processing state parameter of the device.

According to the second or the third implementation of the first aspect, in a seventh implementation, after performing cold reset processing on the device, the method further includes: detecting whether the device is faulty; and, if the device is not faulty, modifying the second value of the fault processing state parameter of the device, and modifying the second value of the fault processing state parameter of the device to the initial value.

According to the first implementation or the third implementation or the sixth implementation of the first aspect, in an eighth implementation, after detecting whether the device is faulty, the method further includes:

if the device is faulty, modifying a connection parameter of the device to obtain a modified connection parameter of the device, where the connection parameter of the device is used to indicate a state of connection between the device and an upstream communications device of the device, and the modified connection parameter of the device is used to indicate that the device and the upstream communications device of the device are not connected; and the performing hot reset processing on the device includes: sending a first reset instruction to a resetter, to instruct the resetter to perform the hot reset on the device.

According to the second implementation of the first aspect, in a ninth implementation, the performing of the cold reset processing on the device includes: sending a power-off instruction to a resetter, where the power-off instruction is used to instruct the resetter to power off the device; and after detecting that the device is powered off, sending a power-on instruction to the resetter, where the power-on instruction is used to instruct the resetter to power on the device.

According to a second aspect, a device fault processing apparatus is provided. The device fault processing apparatus is configured to perform fault processing on a device. The device is a PCIE device, and the device fault processing apparatus includes modules configured to perform the device fault processing method in the first aspect or any possible implementation of the first aspect. The modules may be implemented by hardware, or may be implemented by hardware by executing corresponding software.

According to a third aspect, a device fault processing system is provided, including the device fault processing apparatus in the second aspect, where the device fault processing system further includes a resetter connected to the device fault processing apparatus, the device fault processing apparatus is configured to perform fault processing on a device, and the device is a PCIE device;

the device fault processing apparatus is configured to: after obtaining first device fault information, send a first reset instruction to the resetter based on a first value that is of a fault processing state parameter of the device and that is included in the first device fault information to instruct the resetter to perform hot reset processing on the device, where the first device fault information is used to indicate that the device is faulty, and the first value of the fault processing state parameter of the device indicates that the device is in a soft reset state; and the resetter is configured to perform the hot reset processing on the device after receiving the first reset instruction.

According to the third aspect, in a first implementation, the device fault processing apparatus is further configured to: obtain second device fault information after the resetter performs the hot reset processing on the device; and send a power-off instruction to the resetter based on a second value that is of the fault processing state parameter of the device and that is included in the second device fault information to instruct the resetter to power off the device, where the second device fault information is used to indicate that the device is faulty, the second value of the fault processing state parameter of the device indicates that the device is in a hard reset state, and the power-off instruction is used to instruct the resetter to power off the device; the resetter is further configured to power off the device after receiving the power-off instruction; the device fault processing apparatus is further configured to send a power-on instruction to the resetter after detecting that the device is powered off, to instruct the resetter to power on the device, where the power-on instruction is used to instruct the resetter to power on the device; and the resetter is further configured to power on the device after receiving the power-on instruction.

According to the first implementation of the third aspect, in a second implementation, the device fault processing apparatus is further configured to: obtain third device fault information after the resetter powers on the device; and power off the device based on a third value that is of the fault processing state parameter of the device and that is included in the third device fault information, where the third device fault information is used to indicate that the device is faulty, and the third value of the fault processing state parameter of the device indicates that the device is in a faulty state.

According to the third aspect, in a third implementation, the resetter includes a reset monitoring chip and a hot reset control module, and the reset monitoring chip is connected to the hot reset control module; the reset monitoring chip is configured to send a reset signal to the hot reset control module after receiving the first reset instruction; and the hot reset control module sends a reset notification to the device after receiving the reset signal, to instruct the device to perform the hot reset processing.

According to the first implementation of the third aspect, in a fourth implementation, the resetter includes a reset monitoring chip and a power supply control module, and the reset monitoring chip is connected to the power supply control module; the reset monitoring chip is configured to send a power-off signal to the power supply control module after receiving the power-off instruction; the power supply control module disables, after receiving the power-off signal, an electrical signal connected to the device; the reset monitoring chip is further configured to send a power-on signal to the power supply control module after receiving the power-on instruction; and the power supply control module enables, after receiving the power-on signal, the electrical signal connected to the device.

According to the second implementation of the third aspect, in a fifth implementation, the resetter includes a reset monitoring chip and a power supply control module, and the reset monitoring chip is connected to the power supply control module; the device fault processing apparatus is further configured to send the power-off instruction to the reset monitoring chip based on the third value that is of the fault processing state parameter of the device and that is included in the third device fault information; the reset monitoring chip is configured to send a power-off signal to the power supply control module after receiving the power-off instruction; and the power supply control module disables, after receiving the power-off signal, an electrical signal connected to the device.

According to a fourth aspect, a computer-readable storage medium is provided. The computer-readable storage medium stores an instruction. When the instruction is run on a computer, the computer performs the method in the first aspect or any possible implementation in the first aspect.

According to a fifth aspect, a device fault processing apparatus is provided, including a memory and a processor. The memory is configured to store a software program, and the processor performs the method in the first aspect or any possible implementation in the first aspect by running the software program stored in the memory.

DESCRIPTION OF EMBODIMENTS

The following describes technical solutions in embodiments with reference to accompanying drawings.

Figure 1:
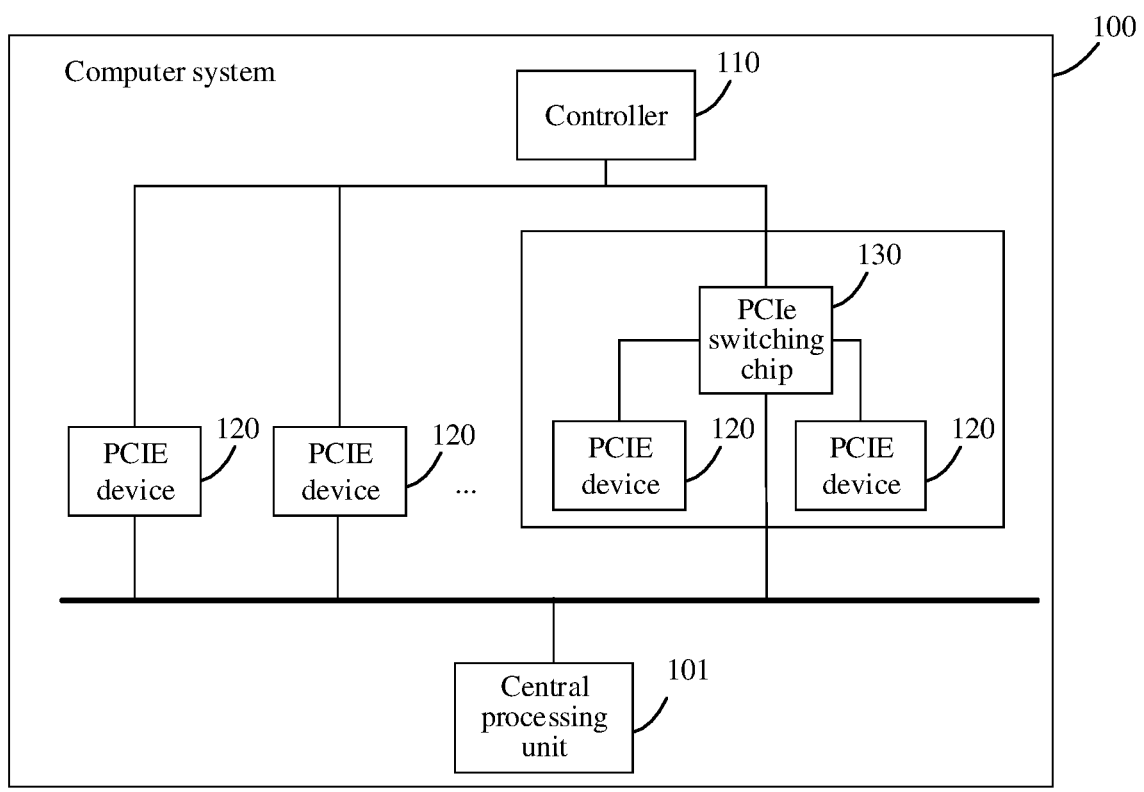
FIG. 1 is a schematic structural diagram of a computer system according to an embodiment.

FIG. 1 is a schematic structural diagram of a computer system according to an embodiment. The computer system 100 includes a central processing unit 101, a controller 110, and at least one PCIE device 120 connected to the controller 110. At least some of the at least one PCIE device 120 are connected to the central processing unit 101. If there are a plurality of PCIE devices 120, at least two of the plurality of PCIE devices 120 may be connected to the controller 110 by using a PCIe switching chip 130. The computer system 100 may include a plurality of PCIe switching chips 130, and each PCIe switching chip 130 is connected to at least two PCIE devices 120. The at least two PCIE devices 120 connected to the PCIe switching chip 130 communicate with the controller 110 by using the PCIe switching chip 130. The computer system 100 has a plurality of implementation structures. For example, the computer system 100 may include a plurality of PCIE devices 120, and each PCIE device 120 is directly connected to the controller 110. Alternatively, the computer system 100 may include a plurality of PCIE devices 120. Some of the PCIE devices 120 are directly connected to the controller 110, and some PCIE devices 120 are connected to the PCIe switching chip 130, and communicate with the controller 110 by using the PCIe switching chip 130. Alternatively, the computer system 100 may include a plurality of PCIE devices 120. Each PCIE device 120 is connected to the PCIe switching chip 130, and communicates with the controller 110 by using the PCIe switching chip 130. A quantity of PCIE devices 120 connected to different PCIE switching chips 130 may be the same or different.

In the computer system 100 of another architecture, a function of the controller 110 may be implemented by using the central processing unit 101. The central processing unit 101 may be any computing device, and may be a general-purpose central processing unit (CPU), a microprocessor, a programmable processor, an application-specific integrated circuit (ASIC), or one or more integrated circuits configured to control execution of a program in the foregoing solution. The computer system 100 further includes a memory. The central processing unit 101 performs various functions and data processing by running or executing a software program and/or an application module stored in the memory and invoking data stored in the memory. During implementation, in an embodiment, the central processing unit 101 may include one or more CPUs. The memory is further configured to store a software program and an application module. The central processing unit 101 runs the software program and the application module stored in the memory, to execute various function applications.

The memory includes a program storage area and a data storage area. The program storage area may store an operating system and an application program that is required by at least one function, for example, sending a response message. The data storage area may store to-be-processed data of the application program. The memory may include a volatile memory, for example, a random access memory (RAM); or the memory may include a non-volatile memory, for example, a read-only memory (ROM), a flash memory, a hard disk drive (HDD), a solid-state drive (SSD), a magnetic disk storage medium or another storage device, or any other medium that can be configured to carry or store expected program code in a form of an instruction or a data structure and that can be accessed by a network device. However, the embodiments are not limited thereto.

Based on the computer system 100 provided in this embodiment, the controller 110 is configured to perform fault processing on the PCIE device 120. The computer system 100 may be a tablet computer, a notebook computer, a mobile Internet device, a palmtop computer, a desktop computer, a mobile phone, a server, or a terminal device in another product form, as desired. A fault on the PCIE device 120 is generally caused by a soft failure. The fault caused by the soft failure may be eliminated by plugging in and plugging out or resetting the PCIE device 120, and the fault caused by the soft failure does not occur subsequently.

An existing method for processing a fault on the PCIE device 120 is to plug in and plug out or reset a pluggable unit in which the faulty PCIE device 120 is located through manual intervention. In this way, other PCIE devices 120 that are not faulty in the pluggable unit cannot work normally, and a plug-in and plug-out operation or a reset operation takes more time. This affects service processing efficiency of the other PCIE devices 120 that are not faulty before the pluggable unit is plugged in and plugged out or reset. Another existing method for eliminating such faults is resetting the computer system 100. This affects all services being processed by the computer system 100, and more soft faults may be caused.

In a device fault processing method provided in this embodiment, after detecting that the PCIE device 120 is faulty, the controller 110 obtains first device fault information. The first device fault information is used to indicate that the PCIE device 120 is faulty. The first device fault information includes a first value of a fault processing state parameter of the PCIE device 120, and the first value of the fault processing state parameter of the PCIE device 120 indicates that the PCIE device 120 is in a soft reset state. After obtaining the first device fault information, the controller 110 performs hot reset processing on the PCIE device 120, so as to implement fault processing on the PCIE device 120 without manual intervention in plugging in and plugging out or resetting the pluggable unit in which the PCIE device 120 is located, and without manual resetting on the computer system 100.

After the controller 110 performs the hot reset processing on the PCIE device 120, if the controller 110 re-detects that the PCIE device 120 is faulty, the controller 110 obtains second device fault information. The second device fault information is used to indicate that the PCIE device 120 is faulty. The second device fault information includes a second value of the fault processing state parameter of the PCIE device 120, and the second value of the fault processing state parameter of the PCIE device 120 indicates that the PCIE device 120 is in a hard reset state. After obtaining the second device fault information, the controller 110 performs cold reset processing on the PCIE device 120, so as to implement fault processing on the PCIE device 120 without manual intervention in plugging in and plugging out or resetting the pluggable unit in which the PCIE device 120 is located, and without manual resetting on the computer system 100.

After the controller 110 performs the cold reset processing on the PCIE device 120, if the controller 110 re-detects that the PCIE device 120 is faulty, the controller 110 obtains third device fault information. The third device fault information is used to indicate that the PCIE device 120 is faulty. The third device fault information includes a third value of the fault processing state parameter of the PCIE device 120, and the third value of the fault processing state parameter of the PCIE device 120 indicates that the PCIE device 120 is in a faulty state. The PCIE device 120 is powered off after the third device fault information is obtained, so as to avoid manual intervention in plugging in and plugging out or powering off the pluggable unit in which the PCIE device 120 is located.

Before obtaining the first device fault information, the second device fault information, and the third device fault information each time, the controller 110 detects whether the PCIE device 120 is faulty, and if the PCIE device 120 is faulty, corresponding first device fault information, corresponding second device fault information, or corresponding third device fault information is generated. Then, the controller 110 queries whether a value of the fault processing state parameter of the PCIE device 120 is a corresponding initial value, the corresponding first value, the corresponding second value, or the corresponding third value.

If the value of the fault processing state parameter of the PCIE device 120 is the initial value, the value of the fault processing state parameter of the PCIE device 120 is modified to the first value. Then, the first device fault information is updated to obtain updated first device fault information. The updated first device fault information includes the first value of the fault processing state parameter of the PCIE device 120.

If the value of the fault processing state parameter of the PCIE device 120 is the first value, the value of the fault processing state parameter of the PCIE device 120 is modified to the second value. Then, the second device fault information is updated to obtain updated second device fault information. The updated second device fault information includes the second value of the fault processing state parameter of the PCIE device 120.

If the value of the fault processing state parameter of the PCIE device 120 is the second value, the value of the fault processing state parameter of the PCIE device 120 is modified to the third value. Then, the third device fault information is updated to obtain updated third device fault information. The updated third device fault information includes the third value of the fault processing state parameter of the PCIE device 120.

Content included in any two of the first device fault information, the second device fault information, or the third device fault information may be the same or different.

After performing the hot reset processing on the device, the controller 110 detects whether the PCIE device 120 is faulty, and if the PCIE device 120 is not faulty, modifies the first value of the fault processing state parameter of the PCIE device 120, and modifies the first value of the fault processing state parameter of the PCIE device 120 to the initial value.

After performing the cold reset processing on the device, the controller 110 detects whether the PCIE device 120 is faulty, and if the PCIE device 120 is not faulty, modifies the second value of the fault processing state parameter of the PCIE device 120, and modifies the second value of the fault processing state parameter of the PCIE device 120 to the initial value.

Before obtaining the first device fault information, the second device fault information, and the third device fault information each time, the controller 110 detects whether the PCIE device 120 is faulty and isolates the device if the PCIE device 120 is faulty. During specific isolation, the controller 110 modifies a connection parameter of the PCIE device 120 to obtain a modified connection parameter of the device. The connection parameter of the PCIE device 120 is used to indicate a state of connection between the PCIE device 120 and an upstream communications device of the PCIE device 120, and the modified connection parameter of the device is used to indicate that the PCIE device 120 and the upstream communications device of the PCIE device 120 are not connected.

The following describes in detail a structure of the controller 110 in the computer system 100 provided in this embodiment based on an architecture of the computer system 100 shown in FIG. 1.

Figure 2:
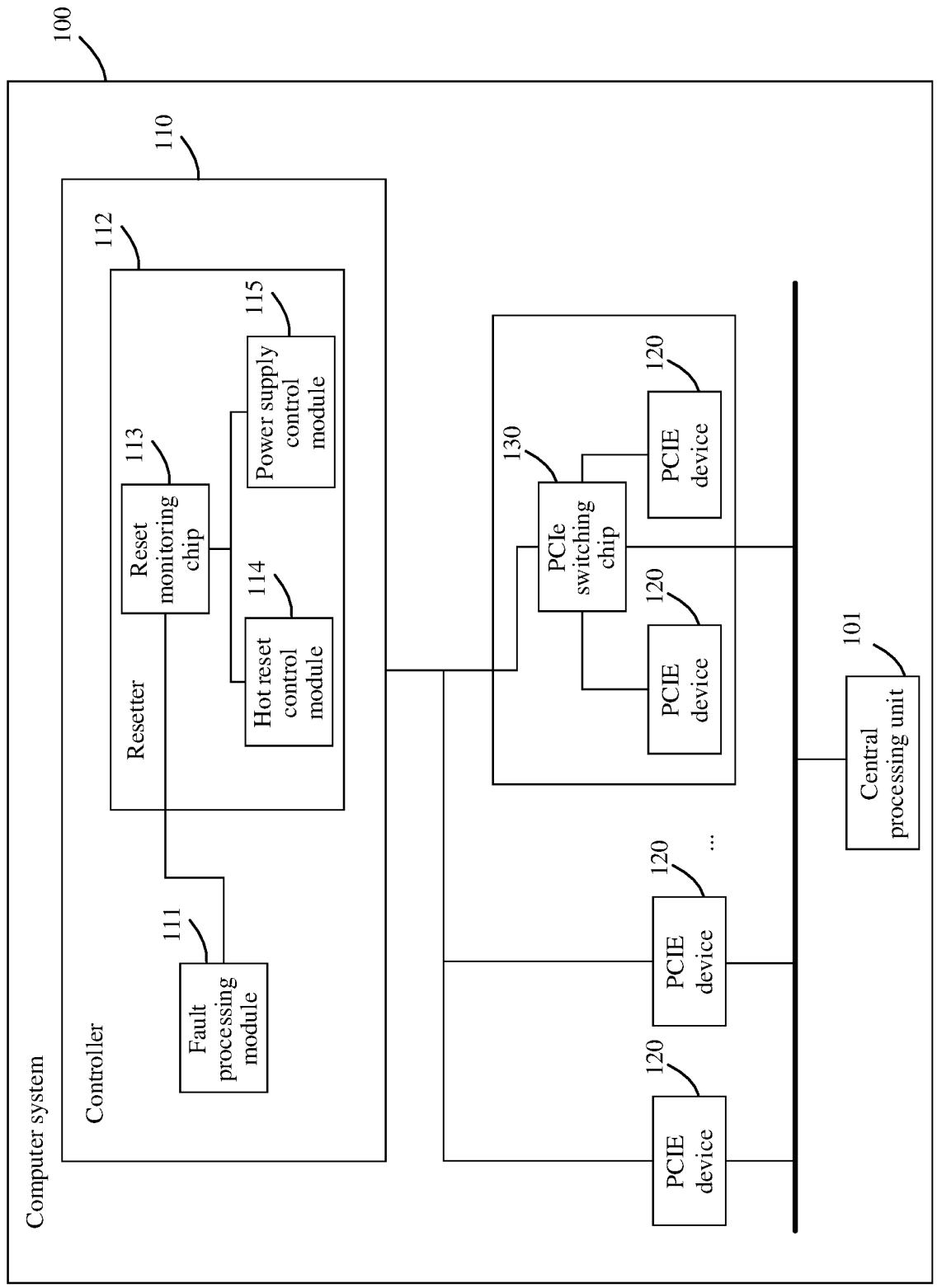
FIG. 2 is a schematic structural diagram of a controller in a computer system according to an embodiment.

FIG. 2 is a schematic structural diagram of a controller in a computer system according to an embodiment. As shown in FIG. 2, a controller 110 in a computer system 100 provided in this embodiment includes a fault processing module 111 and a resetter 112. The fault processing module 111 is communicatively connected to the resetter 112.

The fault processing module 111 is configured to perform fault processing on a PCIE device 120. The fault processing module 111 is configured to obtain first device fault information. The first device fault information is used to indicate that the PCIE device 120 is faulty. Before obtaining the first device fault information, the fault processing module 111 is further configured to: detect whether the PCIE device 120 is faulty; if the PCIE device 120 is faulty, generate the first device fault information; query whether a value of a fault processing state parameter of the PCIE device 120 is an initial value; and if the value of the fault processing state parameter of the PCIE device 120 is the initial value, modify the value of the fault processing state parameter of the PCIE device 120 to a first value. The first device fault information is updated, to obtain updated first device fault information. The updated first device fault information includes the first value of the fault processing state parameter of the PCIE device 120. After obtaining the first device fault information, the fault processing module 111 is further configured to perform hot reset processing on the PCIE device 120.

After detecting that the device is faulty, the fault processing module 111 isolates the PCIE device 120. In other words, a connection parameter of the PCIE device 120 is modified to obtain a modified connection parameter of the device. The connection parameter of the PCIE device 120 is used to indicate a state of connection between the PCIE device 120 and an upstream communications device of the PCIE device 120. The modified connection parameter of the device is used to indicate that the PCIE device 120 and the upstream communications device of the PCIE device 120 are not connected. After obtaining the updated first device fault information, the fault processing module 111 performs the hot reset processing on the PCIE device 120. When performing the hot reset processing on the PCIE device 120, the fault processing module 111 sends a first reset instruction to the resetter 112, so that the resetter 112 performs the hot reset processing on the PCIE device 120 after receiving the first reset instruction.

As shown in FIG. 2, the resetter 112 includes a reset monitoring chip 113 and a hot reset control module 114. The reset monitoring chip 113 is connected to the hot reset control module 114. The reset monitoring chip 113 is configured to send a reset signal to the hot reset control module 114 after receiving the first reset instruction. After receiving the reset signal, the hot reset control module 114 sends a reset notification to the PCIE device 120 to instruct the PCIE device 120 to perform the hot reset processing.

After performing the hot reset processing on the device by using the resetter 112, the fault processing module 111 detects whether the PCIE device 120 is faulty, and if the fault on the device is eliminated, modifies the first value of the fault processing state parameter of the PCIE device 120, and modifies the first value of the fault processing state parameter of the PCIE device 120 to the initial value.

After the fault processing module 111 performs the hot reset processing on the device by using the resetter 112, if the fault on the device is not eliminated or a new fault that is the same as a previous fault or different from the previous fault exists, the fault processing module 111 is further configured to perform cold reset processing on the PCIE device 120.

For example, the fault processing module 111 is further configured to obtain second device fault information after performing the hot reset processing on the PCIE device 120. The second device fault information is used to indicate that the PCIE device 120 is faulty. The second device fault information includes a second value of the fault processing state parameter of the PCIE device 120, and the second value of the fault processing state parameter of the PCIE device 120 indicates that the PCIE device 120 is in a hard reset state. Before obtaining the second device fault information, the fault processing module 111 is further configured to: detect whether the PCIE device 120 is faulty after performing the hot reset processing on the PCIE device 120; if the PCIE device 120 is faulty, generate the second device fault information; query whether the value of the fault processing state parameter of the PCIE device 120 is the first value; and, if the value of the fault processing state parameter of the PCIE device 120 is the first value, modify the value of the fault processing state parameter of the PCIE device 120 to the second value. The second device fault information is updated to obtain updated second device fault information. The updated second device fault information includes the second value of the fault processing state parameter of the PCIE device 120. The fault processing module 111 is further configured to: after obtaining the updated second device fault information, perform the cold reset processing on the PCIE device 120.

After the hot reset processing, if the fault processing module 111 detects that the device is faulty, the fault processing module 111 isolates the PCIE device 120. In other words, the connection parameter of the PCIE device 120 is modified to obtain a modified connection parameter of the device. The connection parameter of the PCIE device 120 is used to indicate the state of connection between the PCIE device 120 and the upstream communications device of the PCIE device 120. The modified connection parameter of the device is used to indicate that the PCIE device 120 and the upstream communications device of the PCIE device 120 are not connected.

When performing the cold reset processing on the PCIE device 120, the fault processing module 111 sends a power-off instruction to the resetter 112. The power-off instruction is used to instruct the resetter 112 to power off the PCIE device 120.

The fault processing module 111 is further configured to: after detecting that the PCIE device 120 is powered off, send a power-on instruction to the resetter 112. The power-on instruction is used to instruct the resetter 112 to power on the PCIE device 120.

As shown in FIG. 2, the resetter 112 further includes a power supply control module 115, and the reset monitoring chip 113 is connected to the power supply control module 115. The reset monitoring chip 113 is configured to send a power-off signal to the power supply control module 115 after receiving the power-off instruction. The power supply control module 115 disables, after receiving the power-off signal, an electrical signal connected to the PCIE device 120. The reset monitoring chip 113 is further configured to send a power-on signal to the power supply control module 115 after receiving the power-on instruction. The power supply control module 115 enables, after receiving the power-on signal, the electrical signal connected to the PCIE device 120.

After performing the cold reset processing on the device by using the resetter 112, if a fault on the device is eliminated, the fault processing module 111 detects whether the PCIE device 120 is faulty, and if the PCIE device 120 is not faulty, modifies the second value of the fault processing state parameter of the PCIE device 120. The second value of the fault processing state parameter of the PCIE device 120 is modified to the initial value.

After the fault processing module 111 performs the cold reset processing on the device by using the resetter 112, if the fault on the device is not eliminated or a new fault that is the same as a previous fault or different from the previous fault exists, the fault processing module 111 is further configured to power off the PCIE device 120.

For example, the fault processing module 111 is further configured to obtain third device fault information after performing the cold reset processing on the PCIE device 120. The third device fault information is used to indicate that the PCIE device 120 is faulty. The third device fault information includes a third value of the fault processing state parameter of the PCIE device 120, and the third value of the fault processing state parameter of the PCIE device 120 indicates that the PCIE device 120 is in a faulty state. Before obtaining the third device fault information, the fault processing module 111 is further configured to: detect whether the PCIE device 120 is faulty, and, if the PCIE device 120 is faulty, the third device fault information is generated; query whether the value of the fault processing state parameter of the PCIE device 120 is the second value; and, if the value of the fault processing state parameter of the PCIE device 120 is the second value, modify the value of the fault processing state parameter of the PCIE device 120 to the third value. The third device fault information is updated to obtain updated third device fault information. The updated third device fault information includes the third value of the fault processing state parameter of the PCIE device 120.

The fault processing module 111 is further configured to power off the PCIE device 120 after obtaining the updated third device fault information.

After performing the cold reset processing on the device, the fault processing module 111 isolates the PCIE device 120 if the fault processing module 111 detects that the device is faulty. In other words, the connection parameter of the PCIE device 120 is modified to obtain a modified connection parameter of the device. The connection parameter of the PCIE device 120 is used to indicate the state of connection between the PCIE device 120 and the upstream communications device of the PCIE device 120. The modified connection parameter of the device is used to indicate that the PCIE device 120 and the upstream communications device of the PCIE device 120 are not connected.

When powering off the PCIE device 120, the fault processing module 111 sends the power-off instruction to the resetter 112. The power-off instruction is used to instruct the resetter 112 to power off the PCIE device 120.

In the controller 110 shown in FIG. 2, the fault processing module 111 may be any computing device, and may be a general-purpose CPU, a microprocessor, a programmable processor, an ASIC, or one or more integrated circuits configured to control program execution in the foregoing solution. The fault processing module 111 executes a device fault processing function by running or executing a software program and/or an application module stored in a memory and invoking data stored in the memory. During implementation, in an embodiment, the fault processing module 111 may include one or more CPUs.

Figure 3:
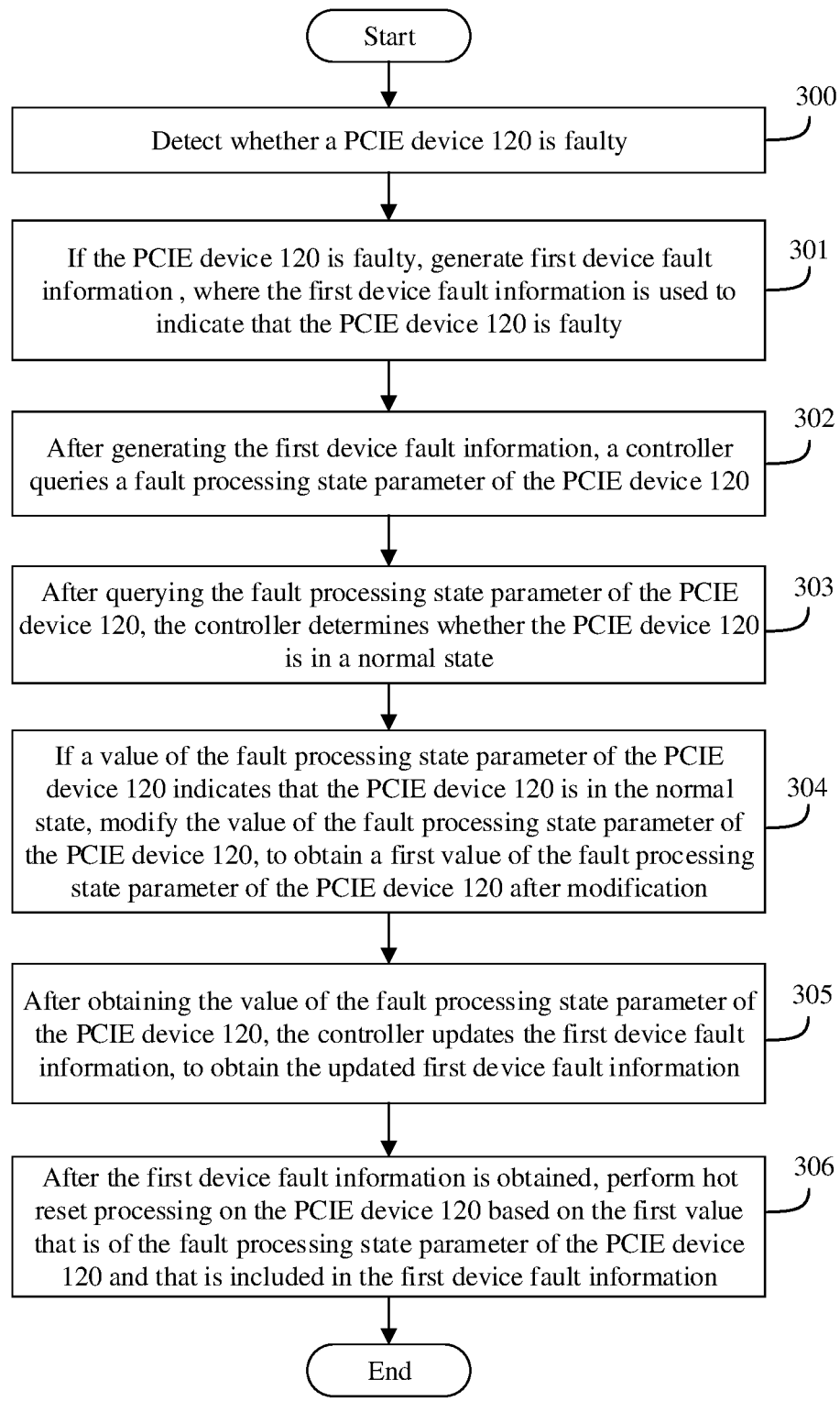
FIG. 3 is a flowchart of a device fault processing method according to an embodiment.

With reference to the computer system shown in FIG. 1 and the structure of the controller 110 shown in FIG. 2, the following describes in detail a device fault processing method according to an embodiment. FIG. 3 is a flowchart of a device fault processing method according to an embodiment. As shown in FIG. 3, the device fault processing method provided in this embodiment may be performed by the controller 110 shown in FIG. 1. For example, steps 300 to 305 may be performed by the fault processing module 111 in the controller 110. The step of sending a first reset instruction to the resetter 112 in step 306 may be performed by the fault processing module 111 in the controller 110 shown in FIG. 2. The step of performing hot reset processing on the device according to the first reset instruction in step 306 may be performed by the resetter 112 in the controller 110 shown in FIG. 2. The device fault processing method shown in FIG. 3 includes the following steps.

300. Detect whether a PCIE device 120 is faulty.

301. If the PCIE device 120 is faulty, generate first device fault information, where the first device fault information is used to indicate that the PCIE device 120 is faulty. The first device fault information may help determine related information that is beneficial to fault recovery on the PCIE device 120, such as a type and fault time of a fault on the PCIE device 120.

Optionally, if the PCIE device 120 is faulty, a connection parameter of the PCIE device 120 is modified to obtain a modified connection parameter of the device. The connection parameter of the PCIE device 120 is used to indicate a state of connection between the PCIE device 120 and an upstream communications device of the PCIE device 120. The modified connection parameter of the device is used to indicate that the PCIE device 120 and the upstream communications device of the PCIE device 120 are not connected. This indicates that the PCIE device is currently unavailable.

Optionally, before the connection parameter of the PCIE device 120 is modified, a value of a base address register of the PCIE device 120 may be read, and the value of the base address register of the PCIE device 120 is stored. In this way, after the device is reset subsequently, the stored value of the base address register may be recovered to the base address register, to ensure that the PCIE device can run normally after being reset.

Optionally, after a space address of the base address register of the PCIE device 120 is read, a resource uninstalling program in a driver of the PCIE device may be invoked, to recycle system resources for which the PCIE device 120 applies at an initialization stage, such as a memory space and an interrupt vector, so as to prevent the faulty PCIE device from occupying resources of a computer system.

302. After generating the first device fault information, the controller queries a fault processing state parameter of the PCIE device 120. The fault processing state parameter of the PCIE device 120 is used to indicate a fault status of the PCIE device 120. The fault status of the PCIE device 120 includes a normal state, a soft reset state, a hard reset state, and a faulty state. The normal state indicates that the PCIE device 120 is not faulty or a fault has been eliminated after the PCIE device 120 is faulty. The soft reset state indicates that hot reset processing needs to be performed on the PCIE device 120. The hard reset state indicates that cold reset processing needs to be performed on the PCIE device 120. The faulty state indicates that the PCIE device 120 is faulty and unavailable. An initial value of the fault processing state parameter of the PCIE device 120 is used to indicate that the PCIE device 120 is in the normal state.

303. After querying the fault processing state parameter of the PCIE device 120, the controller determines whether the PCIE device 120 is in the normal state.

The controller queries whether a value of the fault processing state parameter of the PCIE device 120 is the initial value to determine whether the PCIE device 120 is in the normal state by. If the value of the fault processing state parameter of the PCIE device 120 is the initial value, it indicates that the PCIE device 120 is in the normal state.

304. If the value of the fault processing state parameter of the PCIE device 120 indicates that the PCIE device 120 is in the normal state, modify the value of the fault processing state parameter of the PCIE device 120 to obtain a first value of the fault processing state parameter of the PCIE device 120 after the modification.

The first value of the fault processing state parameter of the PCIE device 120 obtained after the modification indicates that the PCIE device 120 is in the soft reset state, and the hot reset processing needs to be performed on the PCIE device 120.

305. After obtaining the value of the fault processing state parameter of the PCIE device 120 after the modification, the controller updates the first device fault information to obtain updated first device fault information. The updated first device fault information includes the first value of the fault processing state parameter of the PCIE device 120 obtained after the modification. The first device fault information is used to indicate that the PCIE device 120 is faulty, the first device fault information includes the first value of the fault processing state parameter of the PCIE device 120, and the first value of the fault processing state parameter of the PCIE device 120 indicates that the PCIE device 120 is in the soft reset state.

306. After obtaining the first device fault information, perform the hot reset processing on the PCIE device 120 based on the first value that is of the fault processing state parameter of the PCIE device 120 and that is included in the first device fault information.

In step 306, the performing the hot reset processing on the PCIE device 120 includes the following step.

The fault processing module 111 sends a first reset instruction to the resetter 112, so that the resetter 112 performs the hot reset on the PCIE device 120.

Based on step 306, after the hot reset processing is performed on the PCIE device 120, generally, a fault caused by a soft failure may be eliminated. The controller 110 detects whether the device is faulty, and if the device is not faulty, modifies the first value of the fault processing state parameter of the PCIE device 120, and modifies the first value of the fault processing state parameter of the PCIE device 120 to the initial value to indicate that the PCIE device 120 is in the normal state.

Based on step 306, after the hot reset processing is performed on the PCIE device 120, the PCIE device needs to log on again. Therefore, before detecting whether the device is faulty, the controller 110 needs to scan the PCIE device 120, and if the PCIE device 120 is scanned, detects whether the PCIE device 120 is faulty. A manner of scanning the PCIE device is as follows: the connection parameter of the PCIE device 120 is modified to obtain a modified connection parameter of the device. The modified connection parameter of the device is used to indicate that the PCIE device 120 and the upstream communications device of the PCIE device 120 are connected. This indicates that the PCIE device is currently available. After the connection parameter of the PCIE device 120 is modified, a configuration parameter of the PCIE device is recovered to allocate a resource in the computer system to the PCIE device and complete initialization of the PCIE device. A manner of recovering the configuration parameter of the PCIE device may be manual recovery or automatic recovery. During the automatic recovery, recovery is performed based on a pre-stored configuration parameter of the PCIE device, for example, a pre-stored value of the base address register.

Figure 4:
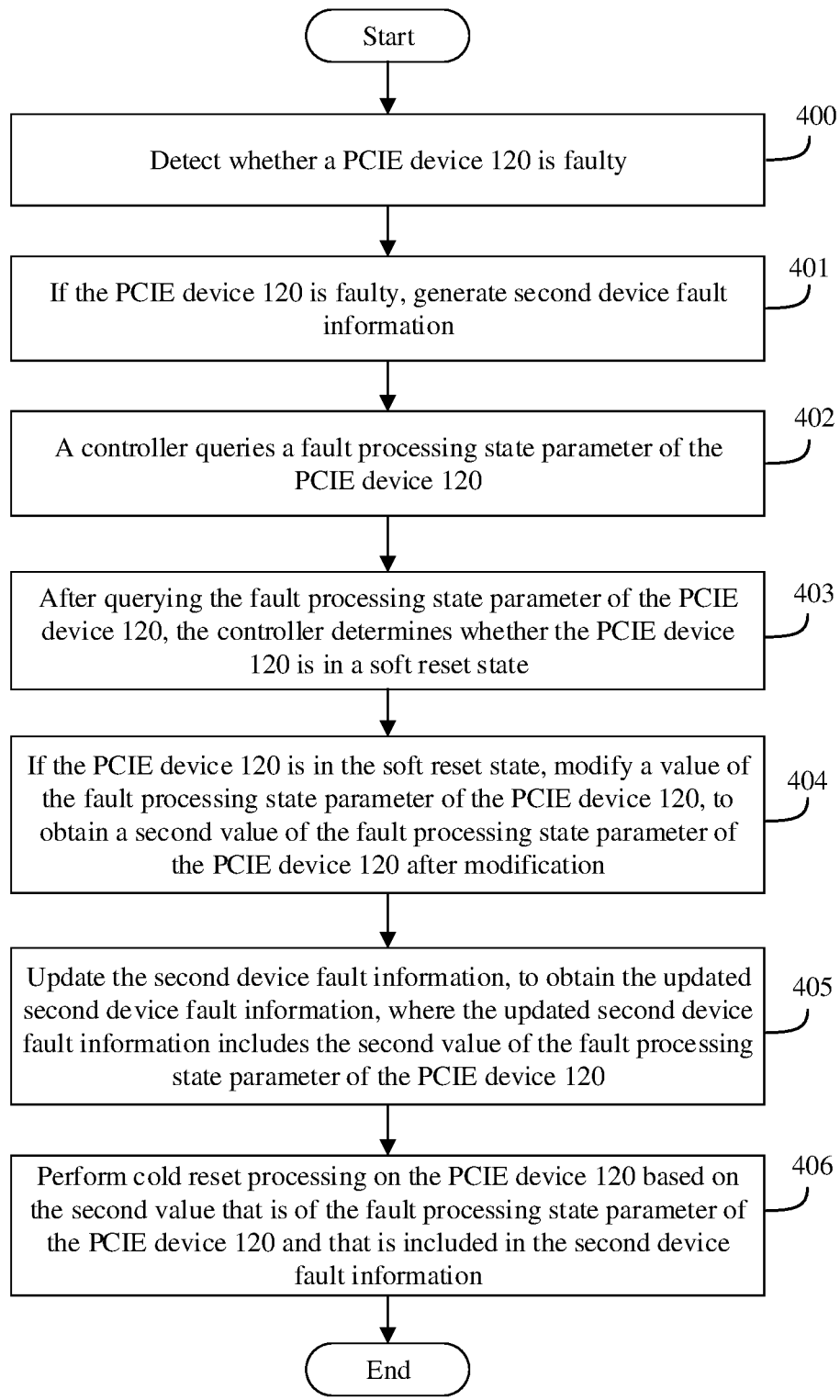
FIG. 4 is a flowchart of another device fault processing method according to an embodiment.

Based on step 306, after performing the hot reset processing on the PCIE device 120, the controller 110 further needs to perform cold reset processing on the PCIE device 120 if the controller 110 detects that the device is faulty. The following describes how to perform the cold reset processing on the PCIE device 120. FIG. 4 is a flowchart of another device fault processing method according to an embodiment. As shown in FIG. 4, the device fault processing method provided in this embodiment may be performed by the controller 110 shown in FIG. 1. For example, steps 400 to 405 may be performed by the fault processing module 111 in the controller 110. A step of sending a power-off instruction to the resetter 112 in step 406 and a step of sending a power-on instruction to the resetter 112 after detecting that the PCIE device 120 is powered off may be performed by the fault processing module 111 in the controller 110 shown in FIG. 2. A step of powering off the device based on the power-off instruction in step 406 and a step of powering on the device based on the power-on instruction may be performed by the resetter 112 in the controller 110 shown in FIG. 2. For details of the device fault processing method shown in FIG. 4, refer to steps 400 to 406.

400. Detect whether the PCIE device 120 is faulty.

401. If the PCIE device 120 is faulty, generate second device fault information. The second device fault information is used to indicate that the PCIE device 120 is faulty.

The second device fault information may help determine related information that is beneficial to fault recovery on the PCIE device 120, such as a type and fault time of a fault on the PCIE device 120.

Optionally, if the PCIE device 120 is faulty, a connection parameter of the PCIE device 120 is modified to obtain a modified connection parameter of the device. The connection parameter of the PCIE device 120 is used to indicate a state of connection between the PCIE device 120 and an upstream communications device of the PCIE device 120. The modified connection parameter of the device is used to indicate that the PCIE device 120 and the upstream communications device of the PCIE device 120 are not connected.

402. After generating the second device fault information, the controller queries a fault processing state parameter of the PCIE device 120.

403. After querying the fault processing state parameter of the PCIE device 120, the controller determines whether the PCIE device 120 is in a soft reset state.

The controller queries whether a value of the fault processing state parameter of the PCIE device 120 is a first value to determine whether the PCIE device 120 is in the soft reset state. If the value of the fault processing state parameter of the PCIE device 120 is the first value, it indicates that the PCIE device 120 is in the soft reset state.

404. If the PCIE device 120 is in the soft reset state, modify the value of the fault processing state parameter of the PCIE device 120 to obtain a second value of the fault processing state parameter of the PCIE device 120 after the modification.

The second value of the fault processing state parameter of the PCIE device 120 obtained after the modification indicates that the PCIE device 120 is in a hard reset state, and cold reset processing needs to be performed on the PCIE device 120.

405. Update the second device fault information to obtain updated second device fault information, where the updated second device fault information includes the second value of the fault processing state parameter of the PCIE device 120. The second device fault information is used to indicate that the PCIE device 120 is faulty, the second device fault information includes the second value of the fault processing state parameter of the PCIE device 120, and the second value of the fault processing state parameter of the PCIE device 120 indicates that the PCIE device 120 is in the hard reset state.

406. Perform the cold reset processing on the PCIE device 120 based on the second value that is of the fault processing state parameter of the PCIE device 120 and that is included in the second device fault information.

In step 406, the performing the cold reset processing on the PCIE device 120 includes the following steps.

A power-off instruction is sent to the resetter 112. The power-off instruction is used to instruct the resetter 112 to power off the PCIE device 120.

After it is detected that the PCIE device 120 is powered off, a power-on instruction is sent to the resetter 112. The power-on instruction is used to instruct the resetter 112 to power on the PCIE device 120.

Based on step 406, after the cold reset processing is performed on the PCIE device 120, generally, a fault caused by a soft failure may be eliminated. The controller 110 detects whether the device is faulty, and if the device is not faulty, modifies the second value of the fault processing state parameter of the PCIE device 120, and modifies the second value of the fault processing state parameter of the PCIE device 120 to an initial value to indicate that the PCIE device 120 is in a normal state.

Based on step 406, after the cold reset processing is performed on the PCIE device 120, the PCIE device needs to log on again. Therefore, before detecting whether the device is faulty, the controller 110 needs to scan the PCIE device 120, and if the PCIE device 120 is scanned, the controller 110 detects whether the PCIE device 120 is faulty. A manner of scanning the PCIE device is as follows: the connection parameter of the PCIE device 120 is modified to obtain a modified connection parameter of the device. The modified connection parameter of the device is used to indicate that the PCIE device 120 and the upstream communications device of the PCIE device 120 are connected. This indicates that the PCIE device is currently available. After the connection parameter of the PCIE device 120 is modified, a configuration parameter of the PCIE device is recovered, to allocate a resource in the computer system to the PCIE device and complete initialization of the PCIE device. A manner of recovering the configuration parameter of the PCIE device may be manual recovery or automatic recovery. During the automatic recovery, recovery is performed based on a pre-stored configuration parameter of the PCIE device, for example, a pre-stored value of the base address register.

Based on step 406, after the cold reset processing is performed on the PCIE device 120, if the controller 110 detects that the device is still faulty, it indicates that a hardware failure may be likely to occur on the PCIE device 120, manual maintenance is required, and the PCIE device 120 is powered off to prevent the PCIE device 120 from occupying resources of a computer system 100 or avoid occurrence of more processing errors. The following describes how to power off the PCIE device 120.

Figure 5:
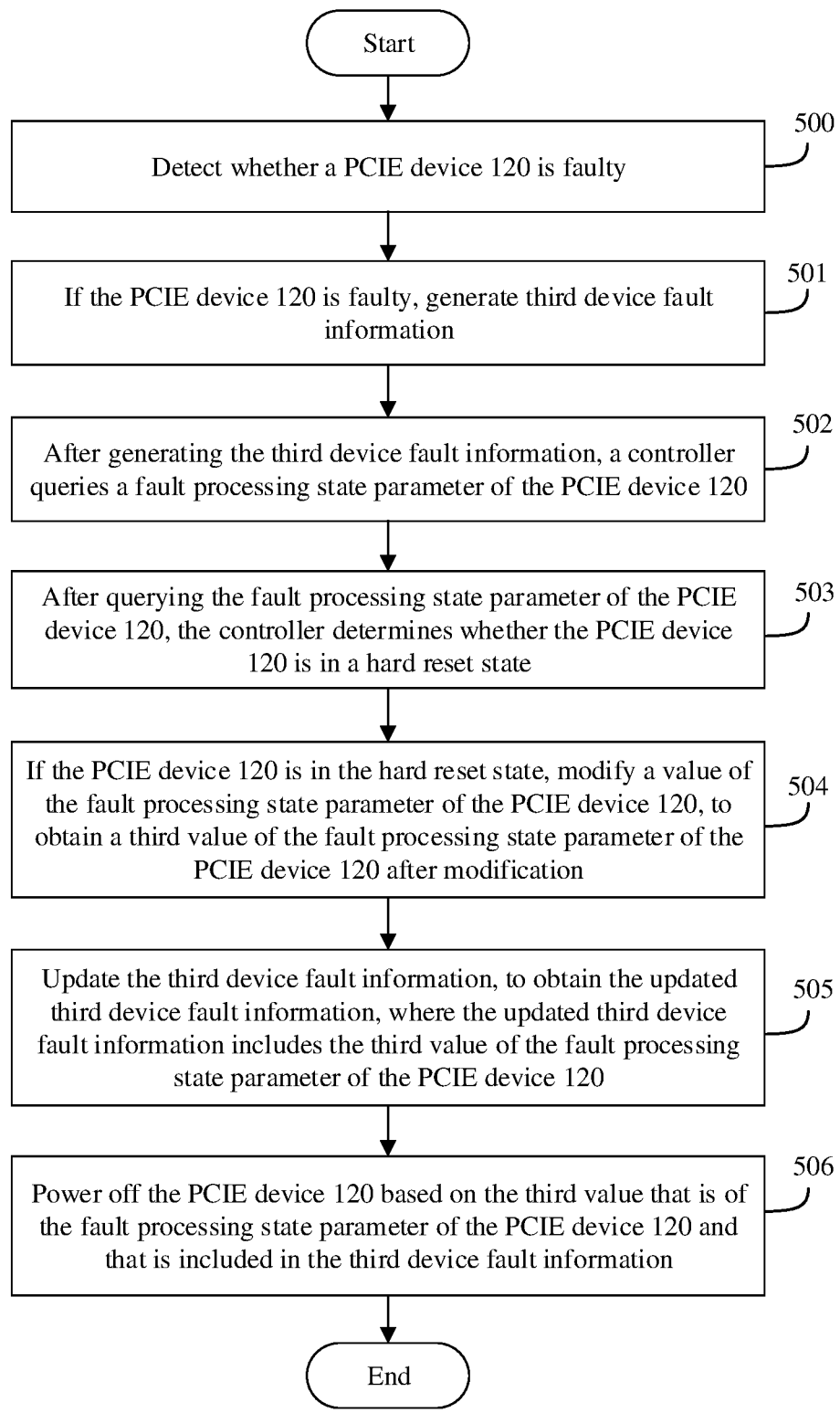
FIG. 5 is a flowchart of another device fault processing method according to an embodiment.

FIG. 5 is a flowchart of another device fault processing method according to an embodiment. As shown in FIG. 5, the device fault processing method provided in this embodiment may be performed by the controller 110 shown in FIG. 1. For example, steps 500 to 505 may be performed by the fault processing module 111 in the controller 110. A step of sending a power-off instruction to the resetter 112 in step 506 may be performed by the fault processing module 111 in the controller 110 shown in FIG. 2. A step of powering off a device based on the power-off instruction in step 506 may be performed by the resetter 112 in the controller 110 shown in FIG. 2. For details of the device fault processing method shown in FIG. 5, refer to steps 500 to 506.

500. Detect whether a PCIE device 120 is faulty.

501. If the PCIE device 120 is faulty, generate third device fault information. The third device fault information is used to indicate that the PCIE device 120 is faulty.

The third device fault information may help determine related information that is beneficial to fault recovery on the PCIE device 120, such as a type and fault time of a fault on the PCIE device 120.

Optionally, if the PCIE device 120 is faulty, a connection parameter of the PCIE device 120 is modified to obtain a modified connection parameter of the device. The connection parameter of the PCIE device 120 is used to indicate a state of connection between the PCIE device 120 and an upstream communications device of the PCIE device 120. The modified connection parameter of the device is used to indicate that the PCIE device 120 and the upstream communications device of the PCIE device 120 are not connected.

502. After generating the third device fault information, a controller queries a fault processing state parameter of the PCIE device 120.

503. After querying the fault processing state parameter of the PCIE device 120, the controller determines whether the PCIE device 120 is in a hard reset state.

The controller queries whether a value of the fault processing state parameter of the PCIE device 120 is a second value to determine whether the PCIE device 120 is in the hard reset state. If the value of the fault processing state parameter of the PCIE device 120 is the second value, it indicates that the PCIE device 120 is in the hard reset state.

504. If the PCIE device 120 is in the hard reset state, modify the value of the fault processing state parameter of the PCIE device 120 to obtain a third value of the fault processing state parameter of the PCIE device 120 after the modification.

The third value of the fault processing state parameter of the PCIE device 120 obtained after modification indicates that the PCIE device 120 is in a faulty state, and the PCIE device 120 needs to be powered off.

505. Update the third device fault information to obtain updated third device fault information, where the updated third device fault information includes the third value of the fault processing state parameter of the PCIE device 120. The third device fault information is used to indicate that the PCIE device 120 is faulty, the third device fault information includes the third value of the fault processing state parameter of the PCIE device 120, and the third value of the fault processing state parameter of the PCIE device 120 indicates that the PCIE device 120 is in the faulty state.

506. Power off the PCIE device 120 based on the third value that is of the fault processing state parameter of the PCIE device 120 and that is included in the third device fault information.

In step 506, the powering off the PCIE device 120 includes the following step. A power-off instruction is sent to the resetter 112. The power-off instruction is used to instruct the resetter 112 to power off the PCIE device 120.

Apparatus embodiments are provided in the following, and may be used to execute the method embodiments. For details that are not disclosed in the apparatus embodiments, refer to the method embodiments. In the following embodiments in FIG. 6 and FIG. 7, two structures of a device fault processing apparatus are separately described. In the following embodiment in FIG. 8, a device fault processing system is described.

Figure 6:
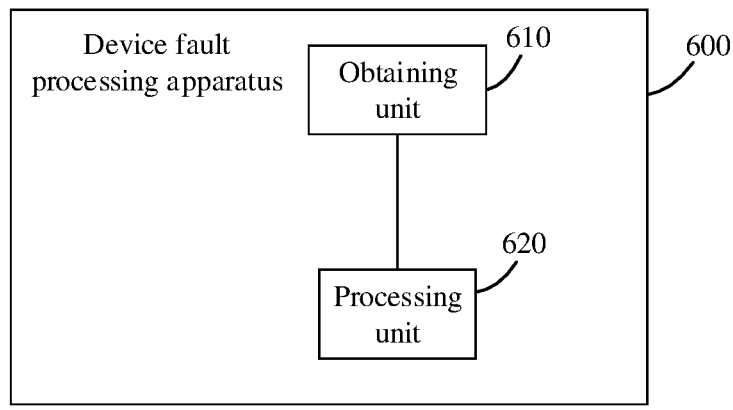
FIG. 6 is a structural block diagram of a device fault processing apparatus according to an embodiment.

FIG. 6 is a structural block diagram of a device fault processing apparatus according to an embodiment. The device fault processing apparatus 600 is configured to perform fault processing on a PCIE device 120. The device fault processing apparatus 600 has a function of implementing a controller 110 in the foregoing method embodiments. The function may be implemented by hardware, or may be implemented by hardware by executing corresponding software. The device fault processing apparatus 600 includes an obtaining unit 610 and a processing unit 620. In this implementation, functions of the obtaining unit 610 and the processing unit 620 may be implemented by a fault processing module 111 in the controller 110 in the foregoing embodiments.

The obtaining unit 610 is configured to obtain first device fault information, where the first device fault information is used to indicate that the PCIE device 120 is faulty, the first device fault information includes a first value of a fault processing state parameter of the PCIE device 120, and the first value of the fault processing state parameter of the PCIE device 120 indicates that the PCIE device 120 is in a soft reset state.

The processing unit 620 is configured to perform hot reset processing on the PCIE device 120 based on the first value that is of the fault processing state parameter of the PCIE device 120 and that is included in the first device fault information.

Figure 7:
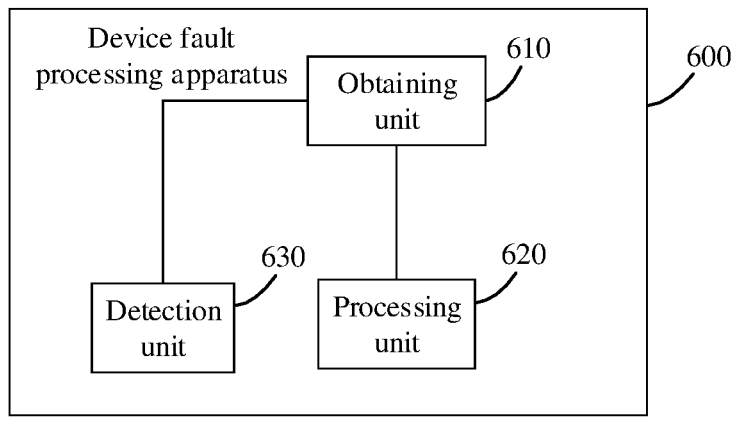
FIG. 7 is a structural block diagram of another device fault processing apparatus according to an embodiment.

Based on the embodiment shown in FIG. 6, in a first optional embodiment, FIG. 7 is another structural block diagram of the device fault processing apparatus according to an embodiment. As shown in FIG. 7, the device fault processing apparatus 600 further includes a detection unit 630. In this implementation, a function of the detection unit 630 may be implemented by the fault processing module 111 in the foregoing embodiments. The detection unit 630 is configured to: detect whether the PCIE device 120 is faulty; if the PCIE device 120 is faulty, generate the first device fault information; query whether a value of the fault processing state parameter of the PCIE device 120 is an initial value; and, if the value of the fault processing state parameter of the PCIE device 120 is the initial value, modify the value of the fault processing state parameter of the PCIE device 120 to the first value. The obtaining unit 610 is further configured to update the first device fault information to obtain updated first device fault information, where the updated first device fault information includes the first value of the fault processing state parameter of the PCIE device 120.

Based on the embodiment shown in FIG. 6 or FIG. 7, in an optional embodiment, the obtaining unit 610 is further configured to obtain second device fault information after the processing unit 620 performs the hot reset processing on the PCIE device 120. The second device fault information is used to indicate that the PCIE device 120 is faulty, the second device fault information includes a second value of the fault processing state parameter of the PCIE device 120, and the second value of the fault processing state parameter of the PCIE device 120 indicates that the PCIE device 120 is in a hard reset state. The processing unit 620 is further configured to perform cold reset processing on the PCIE device 120 based on the second value that is of the fault processing state parameter of the PCIE device 120 and that is included in the second device fault information.

Based on the embodiment shown in FIG. 7, in an optional embodiment, the detection unit 630 is further configured to: detect whether the PCIE device 120 is faulty after the processing unit 620 performs the hot reset processing on the PCIE device 120; if the PCIE device 120 is faulty, generate the second device fault information; query whether the value of the fault processing state parameter of the PCIE device 120 is the first value; and, if the value of the fault processing state parameter of the PCIE device 120 is the first value, modify the value of the fault processing state parameter of the PCIE device 120 to the second value. The obtaining unit 610 is further configured to update the second device fault information to obtain updated second device fault information, where the updated second device fault information includes the second value of the fault processing state parameter of the PCIE device 120.

In another optional embodiment, the detection unit 630 detects whether the PCIE device 120 is faulty after the processing unit 620 performs the hot reset processing on the PCIE device 120, and if the PCIE device 120 is not faulty, modifies the first value of the fault processing state parameter of the PCIE device 120, and modifies the first value of the fault processing state parameter of the PCIE device 120 to the initial value.

In another optional embodiment, the obtaining unit 610 is further configured to obtain third device fault information after the processing unit 620 performs the cold reset processing on the PCIE device 120, where the third device fault information is used to indicate that the PCIE device 120 is faulty, the third device fault information includes a third value of the fault processing state parameter of the PCIE device 120, and the third value of the fault processing state parameter of the PCIE device 120 indicates that the PCIE device 120 is in a faulty state. The processing unit 620 is further configured to power off the PCIE device 120 based on the third value that is of the fault processing state parameter of the PCIE device 120 and that is included in the third device fault information.

In another optional embodiment, the detection unit 630 is further configured to: detect whether the PCIE device 120 is faulty after the processing unit 620 performs the cold reset processing on the PCIE device 120; if the PCIE device 120 is faulty, generate the third device fault information; query whether the value of the fault processing state parameter of the PCIE device 120 is the second value; and if the value of the fault processing state parameter of the PCIE device 120 is the second value, modify the value of the fault processing state parameter of the PCIE device 120 to the third value. The obtaining unit 610 is further configured to update the third device fault information to obtain updated third device fault information, where the updated third device fault information includes the third value of the fault processing state parameter of the PCIE device 120.

In another optional embodiment, the detection unit 630 is further configured to: detect whether the PCIE device 120 is faulty; and if the PCIE device 120 is not faulty, modify the second value of the fault processing state parameter of the PCIE device 120, and modify the second value of the fault processing state parameter of the PCIE device 120 to the initial value.

In another optional embodiment, the detection unit 630 is further configured to: after detecting that the PCIE device 120 is faulty, modify a connection parameter of the PCIE device 120 to obtain a modified connection parameter of the device, where the connection parameter of the PCIE device 120 is used to indicate a state of connection between the PCIE device 120 and an upstream communications device of the PCIE device 120, and the modified connection parameter of the device is used to indicate that the PCIE device 120 and the upstream communications device of the PCIE device 120 are not connected. The processing unit 620 is further configured to send a first reset instruction to a resetter 112, so that the resetter 112 performs hot reset on the PCIE device 120. The structure of the resetter 112 may be implemented by the resetter 112 shown in FIG. 2.

In another optional embodiment, the processing unit 620 is further configured to send a power-off instruction to the resetter 112, where the power-off instruction is used to instruct the resetter 112 to power off the PCIE device 120. The processing unit 620 is further configured to: after detecting that the PCIE device 120 is powered off, send a power-on instruction to the resetter 112, where the power-on instruction is used to instruct the resetter 112 to power on the PCIE device 120. The structure of the resetter 112 may be implemented by the resetter 112 shown in FIG. 2.

Figure 8:
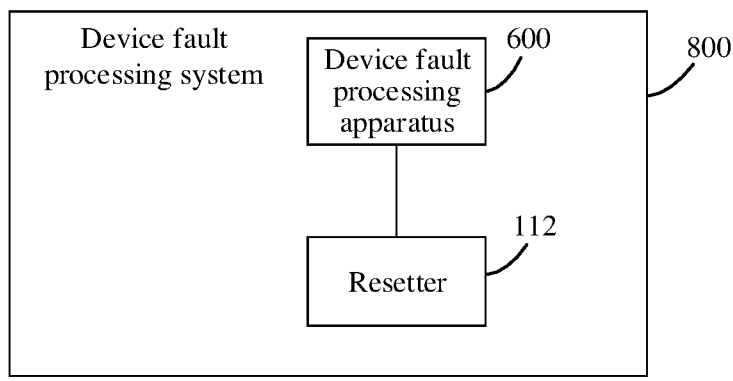
FIG. 8 is a structural block diagram of a device fault processing system according to an embodiment.

FIG. 8 is a structural block diagram of a device fault processing system according to an embodiment. As shown in FIG. 8, an embodiment provides a device fault processing system, which is used to perform fault processing on a PCIE device 120. The device fault processing system has a function of implementing a controller 110 in the foregoing method embodiments. The function may be implemented by hardware, or may be implemented by hardware by executing corresponding software.

The device fault processing system includes the device fault processing apparatus 600 implemented based on any embodiment shown in FIG. 6 or FIG. 7. The device fault processing system 800 further includes a resetter 112 connected to the device fault processing apparatus 600, and the device fault processing apparatus 600 is configured to perform fault processing on the PCIE device 120.

The device fault processing apparatus 600 is configured to: after obtaining first device fault information, send a first reset instruction to the resetter 112 based on a first value that is of a fault processing state parameter of the PCIE device 120 and that is included in the first device fault information to instruct the resetter 112 to perform hot reset processing on the PCIE device 120, where the first device fault information is used to indicate that the PCIE device 120 is faulty, and the first value of the fault processing state parameter of the PCIE device 120 indicates that the PCIE device 120 is in a soft reset state.

The resetter 112 is configured to perform the hot reset processing on the PCIE device 120 after receiving the first reset instruction.

The device fault processing apparatus 600 may be implemented by the fault processing module 111 in the controller 110, and a structure of the resetter 112 may be implemented by the resetter 112 shown in FIG. 2.

Based on the device fault processing system 800 shown in FIG. 8, in a first optional implementation, the device fault processing apparatus 600 is further configured to: obtain second device fault information after the resetter 112 performs the hot reset processing on the PCIE device 120; and send a power-off instruction to the resetter 112 based on a second value that is of the fault processing state parameter of the PCIE device 120 and that is included in the second device fault information to instruct the resetter 112 to power off the PCIE device 120, where the second device fault information is used to indicate that the PCIE device 120 is faulty, the second value of the fault processing state parameter of the PCIE device 120 indicates that the PCIE device 120 is in a hard reset state, and the power-off instruction is used to instruct the resetter 112 to power off the PCIE device 120.

The resetter 112 is further configured to power off the PCIE device 120 after receiving the power-off instruction.

The device fault processing apparatus 600 is further configured to send a power-on instruction to the resetter 112 after detecting that the PCIE device 120 is powered off, to instruct the resetter 112 to power on the PCIE device 120, where the power-on instruction is used to instruct the resetter 112 to power on the PCIE device 120.

The resetter 112 is further configured to power on the PCIE device 120 after receiving the power-on instruction.

Based on the device fault processing system 800 shown in FIG. 8, with reference to the first optional implementation, in a second optional implementation, the device fault processing apparatus 600 is further configured to: obtain third device fault information after the resetter 112 powers on the PCIE device 120, and power off the PCIE device 120 based on a third value that is of the fault processing state parameter of the PCIE device 120 and that is included in the third device fault information, where the third device fault information is used to indicate that the PCIE device 120 is faulty, and the third value of the fault processing state parameter of the PCIE device 120 indicates that the PCIE device 120 is in a faulty state.

Figure 9:
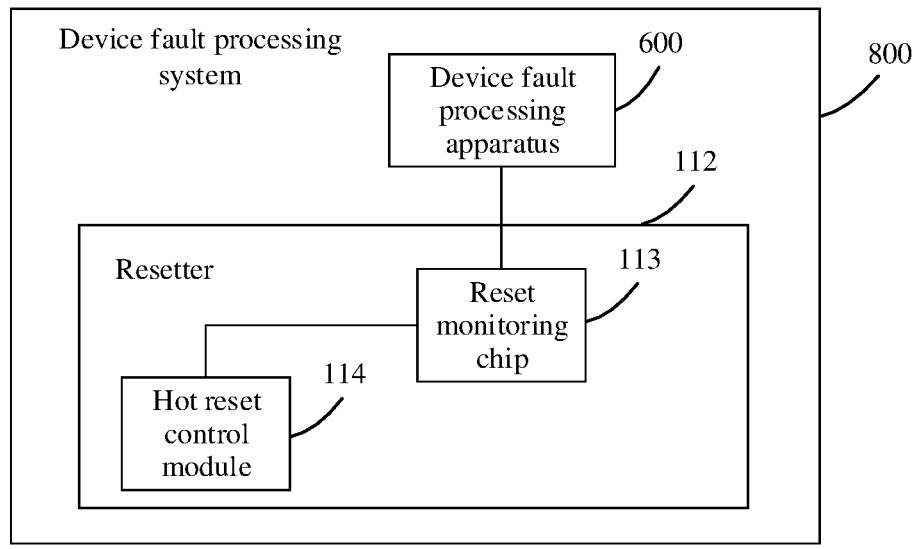
FIG. 9 is a structural block diagram of another device fault processing system according to an embodiment.

Based on the device fault processing system 800 shown in FIG. 8, in another optional implementation, FIG. 9 is a structural block diagram of another device fault processing system according to an embodiment. As shown in FIG. 9, the resetter 112 includes a reset monitoring chip 113 and a hot reset control module 114, and the reset monitoring chip 113 is connected to the hot reset control module 114.

The reset monitoring chip 113 is configured to send a reset signal to the hot reset control module 114 after receiving the first reset instruction.

After receiving the reset signal, the hot reset control module 114 sends a reset notification to the PCIE device 120 to instruct the PCIE device 120 to perform the hot reset processing.

Figure 10:
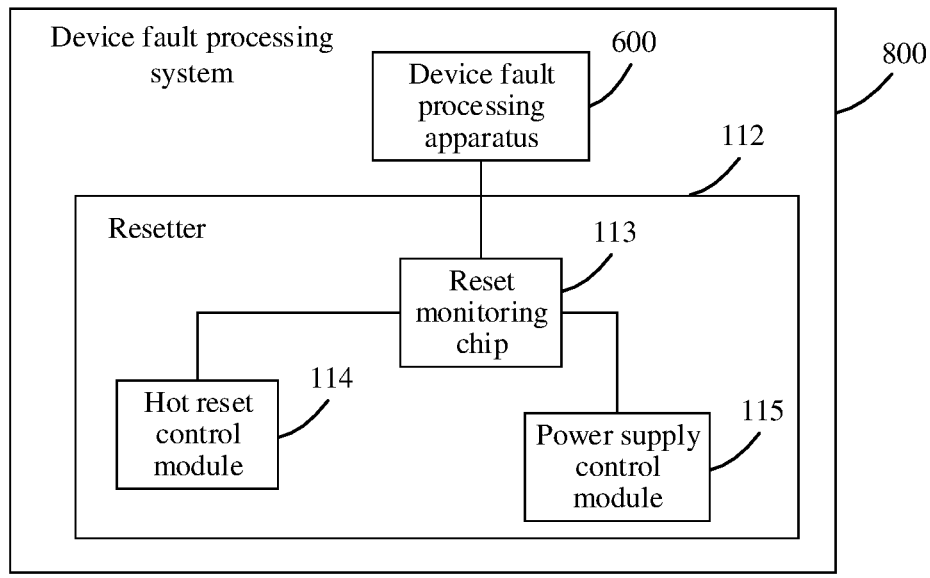
FIG. 10 is a structural block diagram of another device fault processing system according to an embodiment.

Based on the device fault processing system 800 shown in FIG. 9, in another optional implementation, FIG. 10 is a structural block diagram of another device fault processing system according to an embodiment. As shown in FIG. 10, the resetter 112 further includes a power supply control module 115, and the reset monitoring chip 113 is connected to the power supply control module 115.

The reset monitoring chip 113 is further configured to send a power-off signal to the power supply control module 115 after receiving the power-off instruction.

The power supply control module 115 is configured disable, after receiving the power-off signal, an electrical signal connected to the PCIE device 120.

The reset monitoring chip 113 is further configured to send a power-on signal to the power supply control module 115 after receiving the power-on instruction.

The power supply control module 115 enables, after receiving the power-on signal, the electrical signal connected to the PCIE device 120.

Optionally, the device fault processing apparatus 600 is further configured to send the power-off instruction to the reset monitoring chip 113 based on the third value that is of the fault processing state parameter of the PCIE device 120 and that is included in the third device fault information.

The reset monitoring chip 113 is configured to send a power-off signal to the power supply control module 115 after receiving the power-off instruction.

The power supply control module 115 disables, after receiving the power-off signal, an electrical signal connected to the PCIE device 120.

Method steps described in combination with the content disclosed in the embodiments may be implemented by hardware, or may be implemented by a processor by executing a software instruction. The software instruction may include a corresponding software module. The software module may be stored in a RAM, a flash memory, a ROM, an erasable programmable read only memory (EPROM), an electrically erasable programmable read only memory (EEPROM), a register, a hard disk, a removable hard disk, a compact disc read-only memory (CD-ROM), or any other form of storage medium.

A person of ordinary in the art should be aware that in the foregoing one or more examples, functions described in the embodiments may be implemented by hardware, software, firmware, or any combination thereof.

What is claimed is:

1. A device fault processing method performed by a controller, wherein the device is a peripheral component interconnect express device, comprising:
    obtaining first device fault information, wherein the first device fault information is used to indicate that the device is faulty, the first device fault information comprises a first value of a fault processing state parameter of the device, and the first value indicates that the device is in a soft reset state;
    performing hot reset processing on the device based on the first value; and after the performing of the hot reset processing on the device, the method further comprises:
    obtaining second device fault information, wherein the second device fault information is used to indicate that the device is faulty, the second device fault information comprises a second value of the fault processing state parameter of the device, and the second value indicates that the device is in a hard reset state; and
    performing cold reset processing on the device based on the second value,
    the performing of the cold reset processing on the device comprising:
    sending a power-off instruction to a resetter, wherein the power-off instruction is used to instruct the resetter to power off the device; and
    after detecting that the device is powered off, sending a power-on instruction to the resetter, wherein the power-on instruction is used to instruct the resetter to power on the device.

2. The method according to claim 1, wherein before the obtaining of the first device fault information, the method further comprises:
    detecting whether the device is faulty;
    in response to detecting the device is faulty, generating the first device fault information;
    querying whether a value of the fault processing state parameter of the device is an initial value; and
    in response to the value of the fault processing state parameter of the device is the initial value, modifying the value of the fault processing state parameter of the device to the first value.

3. The method according to claim 2, wherein after the detecting of whether the device is faulty, the method further comprises:
    in response to detecting the device is faulty, modifying a connection parameter of the device to obtain a modified connection parameter of the device, wherein the connection parameter of the device is used to indicate a state of connection between the device and an upstream communications device of the device, and the modified connection parameter of the device is used to indicate that the device and the upstream communications device of the device are not connected; and
    the performing of the hot reset processing on the device comprises: sending a first reset instruction to a resetter to instruct the resetter to perform the hot reset on the device.

4. The method according to claim 1, wherein after the performing of the hot reset processing on the device, and before the obtaining of the second device fault information, the method further comprises:
    detecting whether the device is faulty; and
    in response to detecting the device is faulty, generating the second device fault information;
    querying whether the value of the fault processing state parameter of the device is the first value; and
    in response to the value of the fault processing state parameter of the device is the first value, modifying the value of the fault processing state parameter of the device to the second value.

5. The method according to claim 1, wherein after the performing of the hot reset processing on the device, the method further comprises:
    detecting whether the device is faulty; and
    in response to detecting the device is not faulty, modifying the first value of the fault processing state parameter of the device to an initial value.

6. The method according to claim 1, wherein after the performing of the cold reset processing on the device, the method further comprises:
    obtaining third device fault information, wherein the third device fault information is used to indicate that the device is faulty, the third device fault information comprises a third value of the fault processing state parameter of the device, and the third value of the fault processing state parameter of the device indicates that the device is in a faulty state; and
    powering off the device based on the third value.

7. The method according to claim 6, wherein after the performing of the cold reset processing on the device, and before the obtaining third device fault information, the method further comprises:
    detecting whether the device is faulty;
    in response to detecting the device is faulty, generating the third device fault information;
    querying whether the value of the fault processing state parameter of the device is the second value; and
    in response to the value of the fault processing state parameter of the device is the second value, modifying the value of the fault processing state parameter of the device to the third value.

8. The method according to claim 1, wherein after the performing of the cold reset processing on the device, the method further comprises:
    detecting whether the device is faulty; and
    in response to detecting the device is not faulty, modifying the second value of the fault processing state parameter of the device to an initial value.

9. A device fault processing apparatus configured to perform fault processing on a peripheral component interconnect express device, comprising:
    a memory configured to store instructions; and
    a processor coupled to the memory and configured to execute the instructions to:

obtain first device fault information, wherein the first device fault information is used to indicate that the device is faulty, the first device fault information comprises a first value of a fault processing state parameter of the device, and the first value indicates that the device is in a soft reset state;

send a first reset instruction to a resetter to instruct the resetter to perform hot reset processing on the device based on the first value, and, in response to an indication that the device is faulty, modify a connection parameter of the device to obtain a modified connection parameter of the device, wherein the connection parameter of the device indicates a state of connection between the device and an upstream communications device of the device, and the modified connection parameter of the device indicates that the device and the upstream communications device of the device are not connected.

10. The apparatus according to claim 9, wherein the processor is further configured to:

detect whether the device is faulty;

in response to a detection that the device is faulty, generate the first device fault information;

query whether a value of the fault processing state parameter of the device is an initial value; and in response to the value of the fault processing state parameter of the device is the initial value, modify the value of the fault processing state parameter of the device to the first value.

11. The apparatus according to claim 9, wherein the processor is further configured to:

obtain second device fault information after the processing unit performs the hot reset processing on the device, wherein the second device fault information is used to indicate that the device is faulty, the second device fault information comprises a second value of the fault processing state parameter of the device, and the second value indicates that the device is in a hard reset state; and perform cold reset processing on the device based on the second value.

12. The apparatus according to claim 11, wherein the processor is further configured to:

detect whether the device is faulty after the processing unit performs the hot reset processing on the device;

in response to a detection that the device is faulty, generate the second device fault information;

query whether the value of the fault processing state parameter of the device is the first value; and in response to the value of the fault processing state parameter of the device is the first value, modify the value of the fault processing state parameter of the device to the second value.

13. The apparatus according to claim 11, wherein the processor is further configured to:

detect whether the device is faulty; and in response to a detection that the device is not faulty, modify the second value of the fault processing state parameter of the device to an initial value.

14. The apparatus according to claim 9, wherein the processor is further configured to:

detect whether the device is faulty after the processing unit performs the hot reset processing on the device; and in response to a detection that the device is not faulty, modify the first value of the fault processing state parameter of the device to an initial value.

15. A device fault processing system, comprising: a device fault processing apparatus and a resetter connected to the device fault processing apparatus, the device fault processing apparatus configured to perform fault processing on a peripheral component interconnect express device;

the device fault processing apparatus is further configured to: after obtaining first device fault information, send a first reset instruction to the resetter based on a first value that is of a fault processing state parameter of the device and that is comprised in the first device fault information to instruct the resetter to perform hot reset processing on the device, wherein the first device fault information is used to indicate that the device is faulty, and the first value of the fault processing state parameter of the device indicates that the device is in a soft reset state; and the resetter is configured to perform the hot reset processing on the device after receiving the first reset instruction, wherein the resetter comprises a reset monitoring chip and a hot reset control module, and the reset monitoring chip is connected to the hot reset control module;

the reset monitoring chip is configured to send a reset signal to the hot reset control module after receiving the first reset instruction; and the hot reset control module is configured to send a reset notification to the device after receiving the reset signal, to instruct the device to perform the hot reset processing.

16. The system according to claim 15, wherein the device fault processing apparatus is further configured to: obtain second device fault information after the resetter performs the hot reset processing on the device and send a power-off instruction to the resetter based on a second value that is of the fault processing state parameter of the device and that is comprised in the second device fault information to instruct the resetter to power off the device, wherein the second device fault information is used to indicate that the device is faulty, the second value of the fault processing state parameter of the device indicates that the device is in a hard reset state, and the power-off instruction is used to instruct the resetter to power off the device;

the resetter is further configured to power off the device after receiving the power-off instruction;

the device fault processing apparatus is further configured to send a power-on instruction to the resetter after detecting that the device is powered off, to instruct the resetter to power on the device, wherein the power-on instruction is used to instruct the resetter to power on the device; and the resetter is further configured to power on the device after receiving the power-on instruction.

17. The system according to claim 16, wherein the resetter comprises a reset monitoring chip and a power supply control module, and the reset monitoring chip is connected to the power supply control module;

the reset monitoring chip is configured to send a power-off signal to the power supply control module after receiving the power-off instruction;

the power supply control module is configured to disable, after receiving the power-off signal, an electrical signal connected to the device;

the reset monitoring chip is further configured to send a power-on signal to the power supply control module after receiving the power-on instruction; and the power supply control module is configured to enable, after receiving the power-on signal, the electrical signal connected to the device.

\* \* \* \* \*